Feb. 17, 1970   D. A. MOERKE   3,496,328
WELDING GUN
Filed Nov. 24, 1967   3 Sheets-Sheet 1
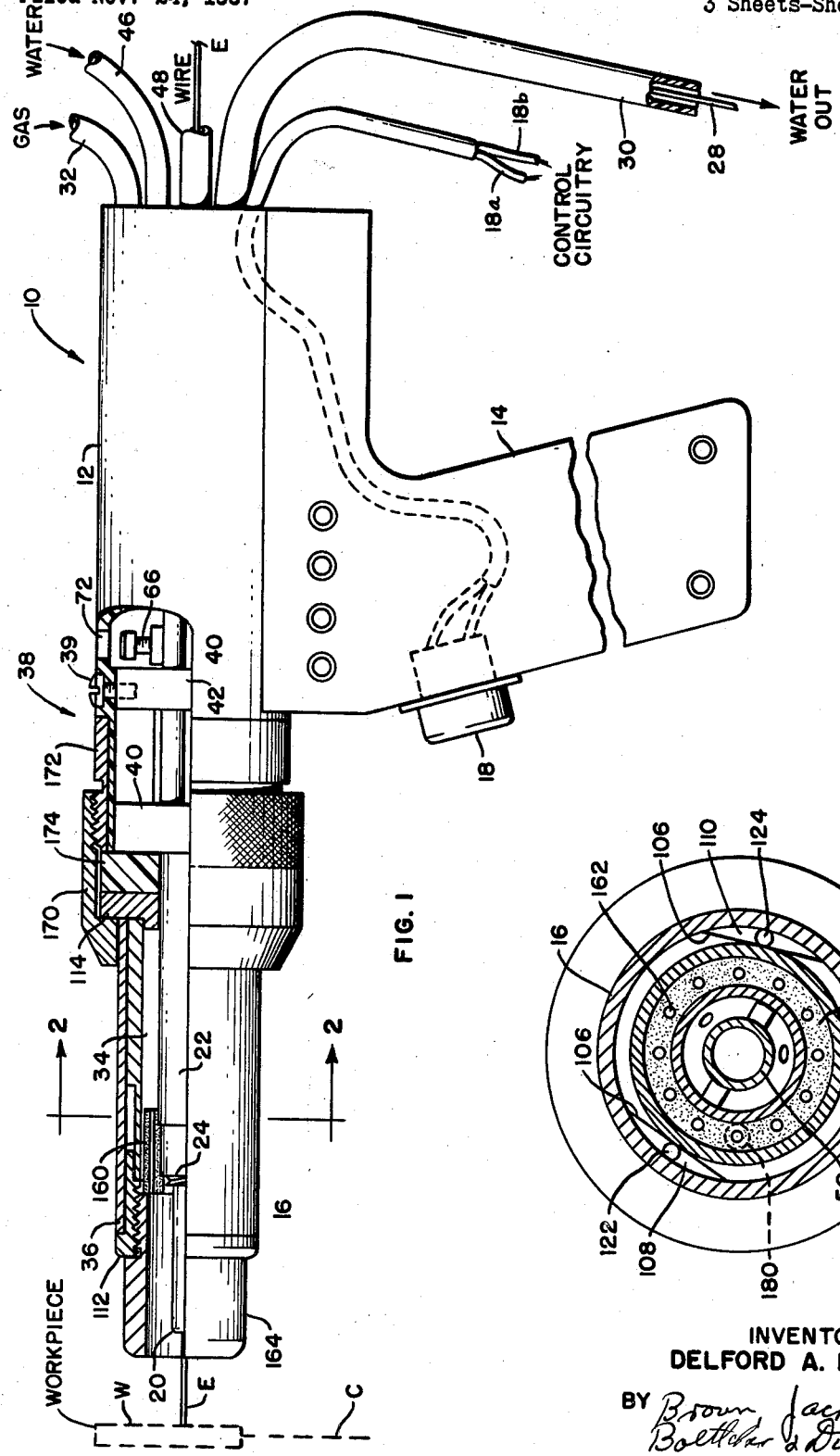
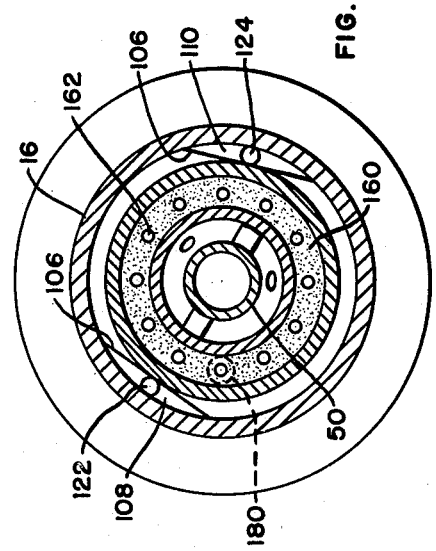
FIG. 2
INVENTOR
DELFORD A. MOERKE
BY Brown, Jackson,
Boettcher & Dienner
ATTORNEYS Feb. 17, 1970
D. A. MOERKE
3,496,328
WELDING GUN
Filed Nov. 24, 1967
3 Sheets-Sheet 2
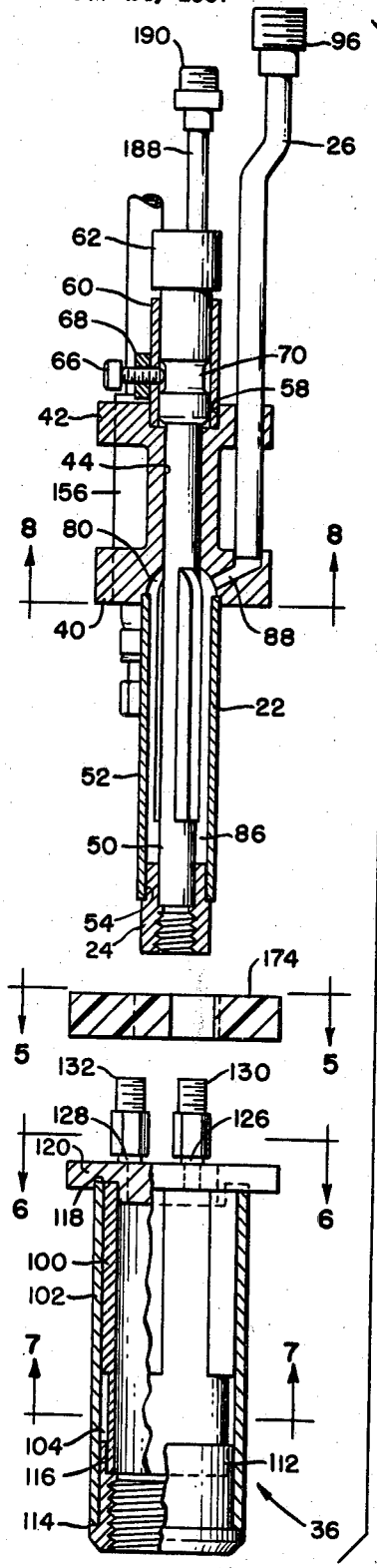
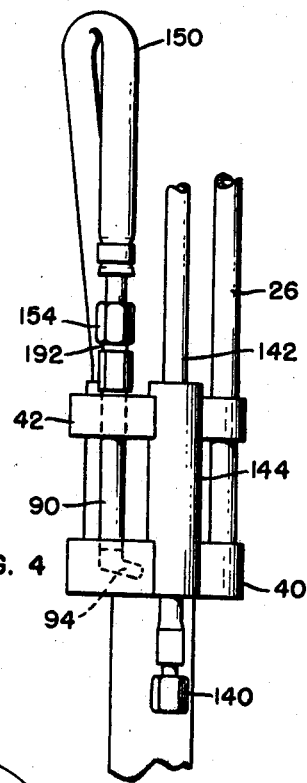
FIG. 3
FIG. 4
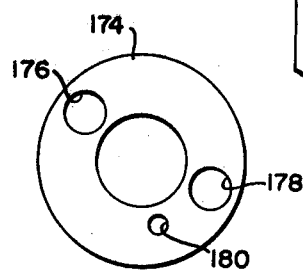
FIG. 5
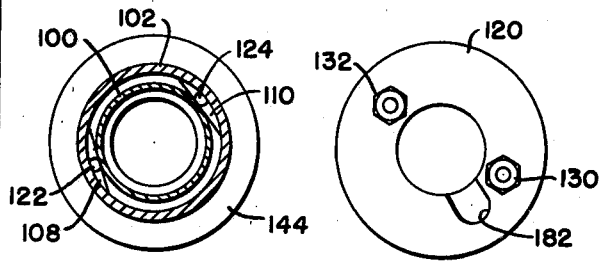
FIG. 7
FIG. 6
INVENTOR
DELFORD A. MOERKE
BY *Brown, Jackson,
Boettcher & Wiener*
ATTORNEYS

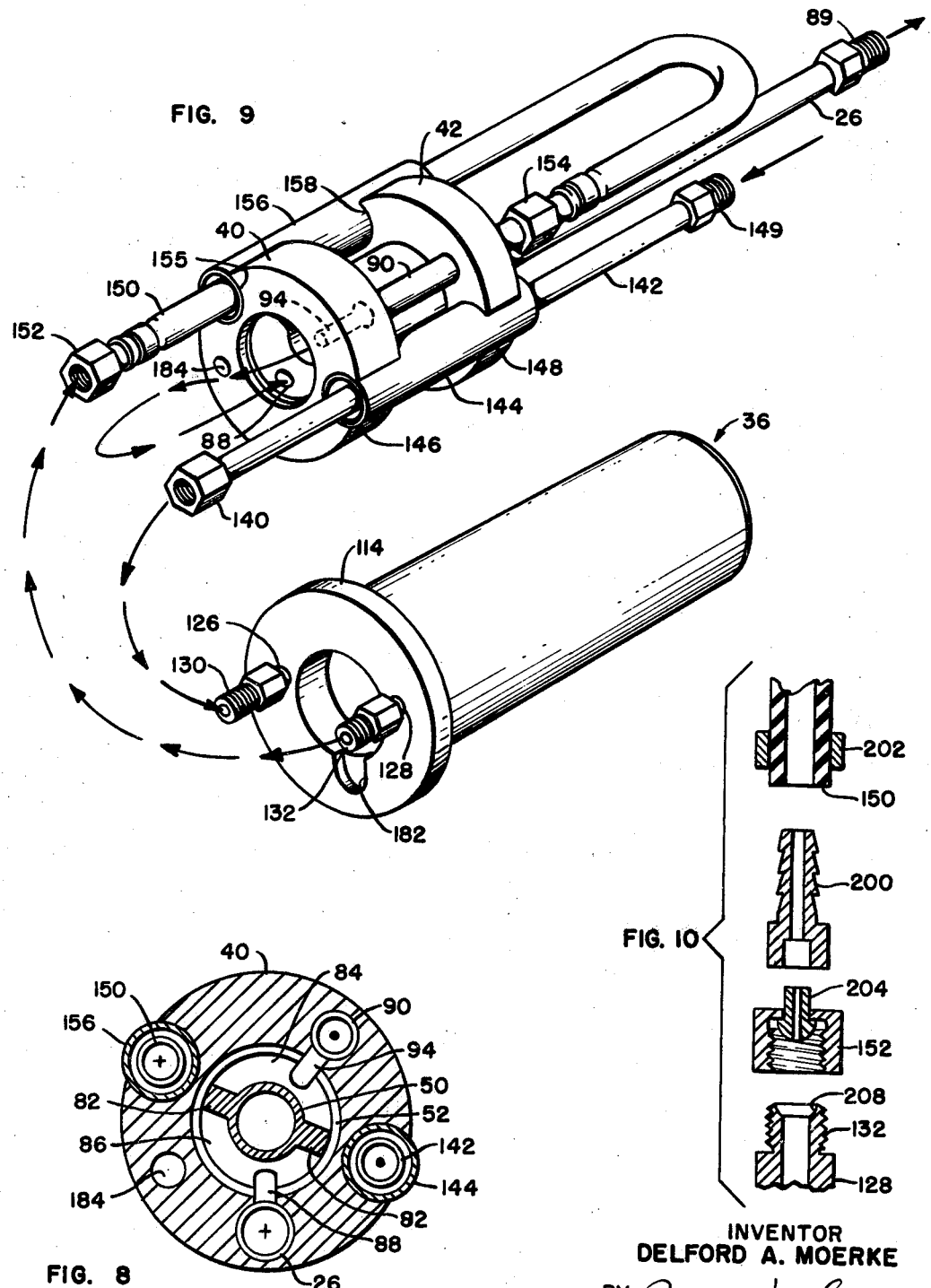

United States Patent Office 3,496,328
Patented Feb. 17, 1970

3,496,328
WELDING GUN
Delford A. Moerke, 127 E. Morningside,
Lombard, Ill. 60148
Nov. 24, 1967, Ser. No. 685,659
Int. Cl. B23k 9/00, 9/16, 35/38
U.S. Cl. 219—130                                    15 Claims

ABSTRACT OF THE DISCLOSURE

Manually-operated portable arc welding gun having a nozzle comprising inner and outer concentric shells, the inner shell having an integral double-flanged spool on its rear end which is removably secured within one end of the gun housing. The inner shell has a longitudinal bore through which an electrode wire feeds and the outer shell is spaced about the inner shell so as to channel a protective shield of gas out through the open end of the nozzle. The outer shell is removably held in this position by means of a nut which threadedly connects to the housing so as to releaseably clamp a provided flange on the outer shell against an adjacent flange on the spool end of the inner shell. The two shells comprise silver-brazed interfitting parts which provide each shell with diametrically-opposite, longitudinally extending internal passages communicating with an encircling chamber at their forward ends. The inner shell has one of its passages connected to a water outlet and the outer shell has one of its passages detachably connected with a tube axially slidably supported on the double-flanged spool end of the inner shell; and a flexible tube similarly slidably supported on said spool end has its opposite ends detachably connected to the other passages of the two shells such that water flows serially through the two shells to cool the outer end of the nozzle, the arrangement permitting the outer shell to be readily dismounted from the assembly without disconnecting the inner shell from the gun housing.

---

This invention relates to welding apparatus and particularly to a novel and improved construction of a portable arc welding gun of the type such as is held by an operator and which he uses by manually moving the nozzle thereof along the seam of workpiece to be united as he actuates a trigger to maintain an arc between the workpiece and a consumable wire electrode fed through its nozzle.

A principal object of the invention is to provide a construction of welding gun which will permit effective fluid-cooling of its nozzle and particularly the end thereof which is closest to the weld and is therefore most subject to heat given off by the molten pool during the welding operation.

Although it has previously been proposed to cool arc welding devices by passing water or other fluids therethrough, conventionally the electrode holder has comprised a number of hollow castings which were assembled together using O-rings or other insulating gaskets between their meeting edges. However, cooling of the nozzle was far from adequate and there was a rapid build up of metal spatter on or about the outer surface of the nozzle and within the end thereof which the operator had to constantly scrape or otherwise remove. Commonly he would attempt to do this either by using a screwdriver to scrape the nozzle surface or by rapping the nozzle on a sharp edge in hopes of dislodging the metal spatter. Both of these practices often resulted in the nozzle being damaged so badly that a part or parts thereof would have to be replaced. This created the further problem of lost time for repairs. In addition, because of the use of O-rings or gaskets, there was always the problem of parts being misaligned in assembly, the gaskets wearing or becoming dislodged so that failure to obtain an adequate seal and with resultant cooling fluid leakage caused further problems.

A feature of the present invention is that an electrode holder or nozzle for an arc welding device is provided which conveniently disassembles into two principal parts, namely an inner shell having a bore through which the wire electrode is fed to the nozzle and an outer shell which is spaced about the inner shell and serves to direct a protective shield of inert gas about the welding arc as it takes place. In accordance with the invention both shells have rearwardly located integral mounting flanges by which they are clamped together within the housing of the gun, the mount of the inner shell embodying a double flanged spool which seats within the gun housing is conveniently removably secured thereto and provides a structure to which the water inlet and outlet, gas line and electrode wire casings as well as the outer shell can be conveniently and readily assembled and/or disconnected.

A further important feature of the invention is that both shells are so constructed that water or other cooling fluid is able to enter the rear ends thereof and flow substantially through the full length thereof and about their outer ends so that the two shells can be kept cool and wherefore accumulation of metal spatter on the nozzle is retarded.

Still another important feature of the invention is that the water chambers of the two shells are serially connected to each other and to the water inlet and outlet by sliding removable connectors such that it is a relatively simple matter to detach the outer shell from the assembly without having to further break down the gun, as when it is necessary to replace the outer shell which is most susceptible to damage.

A further feature of the invention is that both shells including their integral mounting flanges comprise machine parts which are assembled so as to define water passages extending substantially the full length thereof along opposite sides thereof, the parts when assembled having wide bearing contact or interfitting surfaces which are joined by silver brazing so as to eliminate the problem of water leakage and without the disadvantages inherent in the use of O-rings and other forms of gaskets.

Thus in accordance with the invention, each of the two shells making up the nozzle comprise an inner and an outer sleeve in which the inner sleeve is so machined that when assembled within the outer sleeve it provides passages extending lengthwise of the shell which are closed at their rear end by the mounting flange member to which they are integrally secured, these passages being closed at their forward end by means of a plug which in the case of the inner shell also serves to removably mount the current pick up tube and in the case of the outer shell by a plug which constitutes means to which a gas shield or nozzle may be removably connected. These two plugs when assembled within the outer sleeves of the two shells, however, also are related to the assembly of inner and outer sleeves making up each shell as to provide an encircling continuous chamber with which the two lengthwise extending passages communicate. In turn, the rear end of the two passages are ported through their respective mounting flanges so as to be in communication with fixtures on said mounting flanges to which inlet and outlet water conduits can releasably connect.

A further feature of the invention is that the water or other cooling fluid employed is caused to first flow longitudinally of the outer shell in both directions and then through the wall of the inner nozzle shell so that the outer portion of the nozzle which is most subject to metal spattering is the first to be cooled.

Still another feature of the invention is that the water inlet which connects to the outer shell mount is slidably supported on the spool flange of the inner shell and the other side of its water chamber is connected to the inner shell by a flexible tube connector, wherefore the outer one of the two shells comprising the nozzle can be readily separated from the inner shell by moving it axially of the inner shell to displace the two flange mounts upon release of the clamp used to secure the assembly.

Thus an important feature of the invention is the provision of a novel construction of nozzle for an arc welding gun which can be effectively cooled along its full extent and is also sufficiently durable that it can be expected to have a long life and one not subject to constant breakdown for repairs, but comprises a structure which is also readily dismountable at the same time for maintenance and as easily reassembled.

A further feature of the invention is the convenient simplified arrangement provided such that the conductor which is led through the water outlet tube for the cooling effect thereon of the exiting water can be electrically connected to the inner shell so as to place the wire electrode passing therethrough into the electrical welding circuit while the handle, as well as the other exposed surfaces of the gun, including its housing and nozzle, are electrically insulated from the components comprising the conductive path of the electric arc producing circuit.

Still another feature of the invention is the simplified construction of the welding gun which permits the obtaining of the above discussed functions and features in a structure which is also practical to manufacture.

Many other objects, advantages and features of the invention will be apparent at once or will become so from the description of the preferred embodiment of the invention which is hereinafter described in connection with the accompanying drawings.

Referring now to the drawings wherein like numerals are used to identify like parts:

FIGURE 1 illustrates in side elevation an electric arc welding gun embodying the present invention, portions thereof being cut away to illustrate details in the construction of the gun;

FIGURE 2 is a cross sectional view taken along lines 2—2 of FIGURE 1 looking in the direction indicated by the arrows;

FIGURE 3 is a longitudinal sectional view of the inner and outer shells which make up the nozzle and the insulating washer which is assembled between the flanged mounts of the two shells, the same being shown in exploded relation;

FIGURE 4 is a side elevational view of the inner shell and illustrates parts thereof which are not visible in FIGURE 3;

FIGURE 5 is a sectional view taken along line 5—5 in FIGURE 3 looking in the direction of the arrows to illustrate the construction of the insulating washer;

FIGURE 6 is a sectional view taken along line 6—6 of FIGURE 3 looking in the direction indicated by the arrows and shows details in the structure of the flange mount of the outer shell;

FIGURE 7 is a sectional view taken through the outer shell along line 7—7 of FIGURE 3 looking in the direction indicated by the arrows;

FIGURE 8 is a sectional view taken through the inner shell along line 8—8 of FIGURE 3 looking in the direction indicated by the arrows;

FIGURE 9 is a perspective view taken of the nozzle parts in separated relation and illustrates the path the water flows through the parts thereof; and FIGURE 10 is an exploded view of a preferred form of a coupling employed to detachably secure the water conduits to the nozzle shells.

Referring now more specifically to the several views of the drawing as above described, and first to FIGURE 1, the invention is there illustrated embodied in a manually-supported arc welding gun indicated generally at 10. Said gun comprises an open-ended generally cylindrical shaped housing 12 constructed of a high heat and electrical insulating material such as phenolic resin impregnated with paper and/or asbestos fibers and is provided with a supporting hand grip 14 secured to the underside thereof. Hand grip 14 may be made of a more durable material such as metal. The rear end of housing 16 is left open and an electrode holder or nozzle indicated generally at 16 projects outwardly through the forward end thereof. Nozzle 16 comprises a holder for wire electrode E which enters through the open rear end of the housing and is guided by the nozzle 16 into a position such that the operator may locate it adjacent the seam of a workpiece W to be united by welding. Hand grip 14 also has a conveniently located button or trigger 18 which the operator presses when he desires to close the circuit to pass an arc across the junction of the wire electrode E with the workpiece W to form a weld in known manner. For this purpose, as is conventional workpiece W is connected by suitable conductor C to one side of a welding generator or other suitable source of welding current not shown, and in accordance with this invention wire electrode E is connected to the other side of the welding generator through current pick up tip 20, inner shell 22 of the nozzle, plug 24 in the end thereof, outlet tube 26 (FIG. 3) and conductor 28 shown contained within water outlet tube 30 and which connects to the other side of the welding generator. Conventionally the source of welding current is a generator or rectifier which provides the current characteristic required for the arc, the negative terminal of the generator being connected to the workpiece and the positive terminal to the wire electrode. This provides what is characterized as a reverse polarity welding arc when the circuit is closed. The invention, however, is also useful as will be apparent, wherein the workpiece and the wire electrode are oppositely connected, that is with the workpiece connected to the positive side of the direct current source. It may also be employed in other arc welding methods.

Preferably trigger 18 actuates a switch in control circuitry not illustrated to which it is connected by conductors 18a and 18b. This circuitry includes interconnected relays, one of which closes a switch in the described arc welding circuit to produce an arc across the juncture of the wire electrode E with the workpiece; it also includes other relays adapted when button 18 is depressed to simultaneously operate a motor to drive feed rolls not shown by which the wire electrode E is fed into the nozzle 16 and its forward end to the workpiece. Another relay simultaneously energized operates a solenoid which opens a valve to allow an inert shielding gas from a supply not shown to be fed into conduits 32 for delivery thereof into spacer 34 between the inner nozzle body 22 and its outer shell 36 as hereinafter more particularly described and so that a shield of inert gas is provided about the arc in the welding act. The circuitry and apparatus which is actuated by trigger 18 to effect the arc and said simultaneous movement of the wire electrode and gas flow provides no part of the present invention and will therefore not be more particularly described. However, it will be understood that suitable control circuitry and apparatus therefore is described in U.S. Patent 2,504,868 issued to Albert Muller et al., Apr. 18, 1950. Accordingly it will be understood that reference may be had to the disclosure of said patent and that said disclosure is to be understood as incorporated herein as a part of this disclosure by said reference thereto.

Considering now FIGURE 3 with FIGURE 1, the present invention is illustrated as embodied in the nozzle 16 comprising inner and outer shells 22 and 36 respectively, the inner shell 22 having an integral double-flanged mount 38 on its rear end which is removably mounted within the forward end of housing 12 as by set screw 39. Mount 38 of the inner shell is a generally spool shape having a reduced intermediate section with larger-diametered end flanges 40 and 42 and an axial bore 44 therethrough. Its flange 40 has an annular surface of planar shape disposed at right angles to the axis of the nozzle shells and serves as means to which the outer shell is releaseably assembled as afterwards described. Its flange 42 serves as means into which set screw 39 is threadedly connected to secure the same to the gun housing 12. The two flanges of said mount 38 are also suitably apertured so as to constitute aligning means by which water inlet tube 46, water outlet tube 30, gas inlet tube 32 and wire electrode casing 48 which enter the housing through the rear end thereof are releated to the two shells comprising the nozzle 16, also as more particularly later described.

As best illustrated by FIGURE 3, inner shell 22 of the nozzle comprises a pair of concentrically arranged sleeves 50 and 52. Inner sleeve 50 has a through bore only slightly larger than the wire electrode E and serves to guide the wire electrode to the current pick up tip 20. For this purpose, as shown in FIGURE 3, the forward end of inner sleeve 50 snugly seats within the bore of plug 24 to which it is silver brazed along a wide annular area of contact and its rear end extends into and preferably through the bore of the spool shaped mounting 38, being also silver brazed thereto along its length. Flange 42 of the inner shell mount has an annular recess 58 provided in the outer surface thereof communicating with bore 44 which receives the end of a mounting sleeve 60 silver brazed thereto so as to comprise an integral part of the spool mount 38. At 62 is a connector which is permanently fastened to one end of wire electrode enclosing cable 48 and is releasably securable within sleeve 60 as by tightening set screw 66 and so aligns the wire electrode E to be received within the bore of the inner sleeve 50. Set screw 66 is preferably threadedly mounted into a block 62 brazed to sleeve 60 and so that when tightened its inner end moves through an aligned opening in the inner wall of sleeve 60 to engage within a recess 70 of the connector 62 in order to lock the wire electrode casing 48 to the inner shell mount 38. Conveniently, Allen screw 66 has its head aligned with a provided access opening 72 in the upper wall of housing 12 through which the end of an Allen wrench or other tool may be inserted for turning the screw 66. In this arrangement the wire electrode cable can be conveniently assembled and disassembled to the gun without the necessity to break the gun down to its component parts.

Also, as shown in FIGURE 3, outer sleeve 52 has an inner diameter greater than the outer diameter of the inner sleeve 50, its outer or forward end seating within a provided recess 54 about the inner end of plug 24 to which it is silver brazed. As earlier mentioned, plug 24 has a through bore communicating with the bore of the inner sleeve 50 and is internally threaded so as to serve as a mount for detachable connection of the mentioned current pick up tube 20. The opposite or rear end of the outer sleeve 52 is received within an annular recess 80 in flange 40, the end of the outer sleeve being silver brazed thereto along a relatively wide annular area of contact. Considering now FIGURE 8 with FIGURE 3, inner sleeve 50 has a pair of ribs 82 which extend lengthwise of its outer surface in diametrically opposite positions and engage with the inner periphery of the outer sleeve so as to divide the encircling space between the two sleeves into a pair of longitudinally extending passages 84, 86, the rear end of said tube passages being closed by the rounded or otherwise shaped rear ends of the ribs which fits snugly with the inner wall of recess 80. The ribs, however, terminate short of the opposite or forward end of the inner sleeve 50 so as to leave an encircling internal chamber 86 at the outer end of the inner nozzle body 16 which is closed by plug 24 and into which the outer ends of said passages 84 and 86 communicate.

Flange 40 contains a first angled port 88, one end of which communicates within recess 80 to the rear end of passage 86, the other end of said port terminating in an enlarged recess in the rear surface of flange 40 which receives one end of tube 26. The end of tube 26 fitting within said port end is provided with a watertight connection, preferably by silver brazing. Outlet tube 26 is stably mounted on spool mount 38 by silver brazing its intermediate section to the rear flange 42 through which it passes. Also, as shown in FIGURE 3, outlet tube 26 is of a convenient length such that its externally threaded end 89 will be at a distance behind the spool mount 38 which allows for manipulation of the outlet hose 30 for connection to end 89. Outlet tube 26 is also kept short enough so that its end 89 which electrically connects to conductor 28 within the outlet hose 30 is shielded by the insulating housing 12. The two flanges 40 and 42 of the inner shell mount 38 also support a shorter tube section 90 which extends through provided openings in said two flanges and is made integral therewith by silver brazing. The inner or forward end of said shorter tube section 90 is received within and silver brazed to the enlarged end of bore 94 in flange 40, port 94 communicating with passage 84 between the two sleeves of the inner shell, as illustrated by FIGURE 4. The other or rear end of short tube section 90 terminates in an externally threaded end 92 located behind flange 42.

Still considering FIGURE 3 with FIGURE 1, it will be seen that the outer shell 36 of the nozzle also comprises an inner sleeve 100 and an outer sleeve 102. In this case, however, as is shown best by FIGURE 7, inner sleeve 100 snugly fits within the bore of outer sleeve 102 except along longitudinal portions 106 of its outer periphery which have been milled flat so that when assembled within sleeve 102 the outer nozzle shell 36 is provided with a pair of longitudinally extending passages 108 and 110. In said FIGURE 3, the forward end of inner sleeve 100 is also shown as having been reduced in diameter so as to provide an annular chamber 104 at the forward end of the outer shell with which its passages 108 and 110 communicate. The forward ends of the two sleeves are shown silver brazed to a plug 112 having an external recess at 114 which receives the outer end of sleeve 102 and an annular lip 116 which extends partially into chamber 104. The silver brazing is preferably effected throughout the surfaces of the two sleeves which meet with the plug 112 so as to effect a watertight heat resisting permanent assembly at said forward end of the outer shell which is closest to the heat of the arc welding operation. The inner or rear ends of the assembled sleeves 100 and 102 are shown received within an annular recess 118 in a mounting disc or flange bearing mount 120, these received ends also being silver brazed to the surface of said recess to complete the outer shell assembly. Flange bearing disc or mount 120 has ports 122 and 124 extending therethrough and these communicate with passageways 108 and 110 respectively. Said ports 122 and 124 each have a larger recessed end in the rear wall of mounting disc 120 to which the ends of short tube sections 126 and 128 seat and are integrally joined by silver brazing. The outer or rear ends of said tube sections 126 and 128 are provided with externally threaded ends 130 and 132. Thus the inner and outer sleeves 100 and 102 constitute with the mounting flange or disc 120 an integral structure having longitudinally extending diametrically oppositely located passages 108 and 110 which communicate with respective tube sections 130 and 132 at their rear ends and an encircling chamber 104 at their forward end. The two sleeves comprising the outer shell of the nozzle, however, also have wide area surface contact with each other throughout their length and are also integrally connected to plug 112 and mounting disc 120 providing strength and rigidity to the assembly so that when assembled about the more injury prone inner shell it provides a protective, as well as cooling, function.

Considering now also FIGURE 9 with FIGURES 1 and 3, end 130 of tube section 126 detachably couples to an internally threaded connector 140 on the end of a tube 142 which is slidably supported within a nylon bushing 144 mounted within provided recesses 146 in the outer periphery of flanges 40 and 42 of the inner shell mounting structure 38. Tube 142 is therefore free to move axially with respect to the two shells 22 and 36 of the nozzle. The rear end of axially slidable tube section 142 is externally threaded at 149 beyond flange 42 for detachable coupling to the water inlet hose 46. As shown best in FIGURE 9, the water passages of the two shells are also releasably connected in communicating relation by means of a flexible rubber tube which contains a stainless spring for maintaining the opening therethrough during bending. Tube 150, however, may also be formed of any other suitable flexible and heat and electrical resistant material such as that commonly employed for constructing the water inlet and outlet hoses of arc welding guns. As shown in FIGURE 9, flexible tube 150 has an internally threaded coupling 152 at one end which is detachably connected to the externally threaded end 132 of tube section 128 and a second internally threaded coupling 154 at its opposite end which detachably connects to end 92 of the short tube section 90 of the inner shell. Also, as shown in FIGURE 9, tube 150 extends through a nylon insulator 156 which is supported within cutouts 158 in the outer periphery of flanges 40, 42 of the inner shell mount 38. Flexible tube 150 therefore like tube 142 is free to move axially with respect to the two nozzle shells and preferably has a length sufficient to accommodate movement of the outer shell from the assembled position illustrated in FIGURE 1 to one substantially, if not completely, off the inner shell 22. As shown in FIGURE 1, when assembled about the inner shell 22 the flange bearing disc mount 120 is clamped against the adjacent surface of the forward flange 40 of the inner shell mount as by a clamping nut 170, an insulating washer 174 being disposed between the surfaces so that the outer shell is electrically insulated from flange 40 of the inner shell assembly. By loosening clamp nut 170 on its threaded connection with member 172 of the gun housing 12, it will be appreciated that the flexible character of tube 150 and the slidable mounting of tube section 142 will permit the outer shell 36 to be moved forwardly of the inner shell 22 a sufficient distance to allow couplings 152 and 140 to be detached from ends 130 and 132 of the outer shell so that it may be completely removed as for replacement.

As graphically illustrated by FIGURE 9, the described assembly permits a cooling fluid, such as water, to be flowed through the two shells of the nozzle from inlet hose 46. As indicated by the arrows in FIGURE 9, water entering from inlet hose 46 first passes through tube section 142 into tube section 126 and through port 124 into passageway 110 of the outer shell to the end of the nozzle where it encircles the forward end of the outer shell through chamber 104 and exits rearwardly thereof through passage 108 out port 122 into tube section 128 and into flexible tube 150 from whence it is passed into passage 84 of the inner nozzle shell via tube section 90 and port 94. Water then continues to flow outwardly of the inner shell into chamber 86 at its outer end and then exits lengthwise of the inner shell through its other passage 86 out port 88 into tube section 26 which connects to the outlet hose 30. Thus both the inner and outer shells of the nozzle are cooled throughout their full length and completely about their outer ends. The fluid is also caused to pass through the outer shell first so that the portion of the nozzle most subject to metal spatter is effected by the coolest part of the water flow. Not only does the water path in both shells extend substantially out to the ends of the two shells held closest to the weld during use of the gun, but the assembly comprising the two shells is permanently watertight and not subject to leakage through breakdown of insulating gaskets, O-rings and the like which characterize the prior art. Furthermore, the cooling is effected throughout the full length of both shells, and at the same time providing a structure which is not readily susceptible to injury but is at the same time easily and quickly separable into its component parts to permit replacement of either or both shells of the nozzle when repairs are required and/or it is necessary to go to a different nozzle shape or length.

As afterwards described, outer shell 36 has an internal diameter greater than the outer diameter of the inner shell 22 which connects to the gas supply hose 32 and thereby functions as means for channeling inert gas about the inner shell and to the outer end of the nozzle where it may be directed outwardly to provide a protective shroud about the arc. For this reason, the outer shell 36 has a length greater than the inner shell 22 and preferably its plug 112 is internally threaded to permit mounting a gas directing nozzle piece 164 thereto. Preferably, also the outer shell is held in spaced encircling relation about the inner shell 22 by means of annular shaped spacer element 160 (FIGS. 1 and 2) having openings 162 therethrough for passage of gas. Spacer element 160 is preferably constructed of a relatively strong and electrically insulating material which will permit it to limit the insertion of a screwdriver or other device by the operator to prevent possible damage to the inner shell.

As described, both spacer 160 and washer 174 are of a highly heat resistant and electrical insulating material and for which purposes they may comprise a material such as asbestos impregnated phenolic resin, an example of which is commercially available under the name Synthane. Spacer 160 and washer 174 serve to electrically isolate the outer shell 36 from the inner shell 22 and its spool mount 38 which electrically connect the conductor 28 and tube section 26 to the current pick up tube 20 through which the wire electrode E passes. Housing 12 is also suitably recessed at 172 to receive the head of the set screw 39 which threads into flange 42 of the inner shell spool mount wherefore the head of the set screw may be displaced below the surface to minimize the possibility of it being accidentally brushed by the operator. Thus by the described construction, it will be appreciated that the entire external surface of the arc welding gun is electrically insulated from the wire electrode E, although the same is connected to the conductor 28 through the inner shell and its mount.

As illustrated by FIGURE 5, it will be further understood that insulating washer 174 is necessarily provided with a pair of apertures 176 and 178 through which tube sections 126 and 128 respectively extend in order to connect with flexible tube 150 and slidable outlet tube section 142. Insulating washer 174 is also provided with a further aperture 180 which aligns with recess 182 in the annular mounting disc 120 of the outer shell assembly, recess 182 communicates with the bore of the outer sleeve as seen in FIGURE 6. Also as shown in FIGURE 3, when considered with FIGURE 8, spool mount 38 has an integrally secured tube section 188 provided with a rear externally threaded end 190 by which it is detachably mounted to the gas hose 32, its forward end secured within opening 184 which aligns with aperture 180 in the insulating washer 174. Consequently, with washer 174 properly aligned and clamped between mounting flange 120 of the outer shell and the forward flange 40 of the inner shell mounting, gas is able to flow from hose 32 through the tube section 188, opening 180 of a washer 174 and into recess 182 to the space provided by outer shell 36 about the inner shell 22 of the nozzle and through the perforations 162 in the spacer 160 to the gas directing nozzle 164.

It will be understood that any suitable coupling means may be employed for detachably connecting tube fitting 132 of the outer shell 36 to tube section 142 and it in turn to the water outlet hose as well as for connecting the opposed ends of the flexible tube 150 to respective tube fillings of the two shells and the couplings of the gas and water inlet hoses. Many couplers are known in the art as being suitable for obtaining a quickly detachable yet watertight connection between two tube ends. One particularly useful construction is illustrated by FIGURE 10, wherein a coupler 152 is shown connecting one end of the flexible tube 150 to fitting 132 of tube section 128. It will be understood, however, that the same type of coupling construction can also be employed at 140, 149 and 154, as well as at 89 and 190. Referring therefore first to FIGURE 10, because tube 150 is comprised of a non-metallic material such as rubber, the coupling connection includes a hose gland 200 which is inserted within the end of the flexible hose 150. As shown insert 200 has a serrated shank which when inserted into the bore of tube 150 expands the same and is securely clamped therein as by a clamping ring 202. In this arrangement coupling 152 actually comprises an internally threaded cup nut which is secured to the outer end of the insert 200 by connector 204 having a cylindrical stem which is fitted within the bore of the insert and silver brazed to the inner walls thereof. The outer surface of said connector is rounded as at 206 so that when nut 152 is threaded onto the external threads of fitting 132 it draws said cup shaped surface 206 against the concave shaped ends 208 of the fitting 132 so that an effective yet readily releasable watertight connection is obtained. Where a metal tube is to be connected to a metal tube, the insert 200 and clamp ring 202 are omitted and the connector 204 is directly brazed to the bore of the metal tube with which it is assembled.

As thus described, it will be apparent that all the recited objects, features and advantages of the invention have been demonstrated as obtainable in a highly practical and efficiently operating structure. It will furthermore be understood that the thus described embodiment is not to be taken in a limiting sense, but rather as illustrative of the invention, since the described parts and their arrangement may be modified by those well skilled in the art without departing from the spirit of the invention, the limits and bounds of the invention being defined by the appending claims.

Thus, having described my invention, I claim:

1. In a welding gun, the combination of an open-ended housing and a nozzle comprising an inner nozzle body having a wire electrode feeding bore therethrough and an outer nozzle body in spaced encircling relation about said inner nozzle body, the inner nozzle body having an encircling laterally flanged rear end portion secured within said housing, the outer nozzle body having an encircling lateral mounting flange at its rear end aligned with said laterally flanged rear end portion, clamping means releasably clamping said mounting flange to the flanged rear end portion of the inner nozzle body, said mounting flange of the outer nozzle body and flanged end portion of the inner nozzle body having aligned apertures through which gas may flow from a source connected to the flanged rear end portion of the inner nozzle body into the space between the two nozzle bodies, and means for detachably connecting a wire electrode casing to said rear end portion of the inner nozzle body in alignment with the bore therethrough.

2. The combination of claim 1 wherein the housing contains an access opening through which said means for detachably connecting a wire electrode casing is operable.

3. The combination of claim 1 wherein the inner nozzle body is adapted to electrically connect one side of a source of welding current to the wire electrode which feeds through its bore, the outer nozzle body being electrically insulated therefrom by an insulating member clamped between the mounting flange of the outer nozzle body and the flanged rear end portion of the inner nozzle body, said insulating member having an opening therethrough which aligns with the openings in said mounting flange and flanged rear end portion of the inner nozzle body for the passage of gas.

4. The combination of claim 1 wherein each said nozzle body contains a cooling fluid chamber encircling at least the outer end thereof.

5. The combination of claim 4 wherein said chambers of the two nozzles are connected in series with each other and to inlets and outlets for the passage of cooling fluid therethrough.

6. The combination of claim 5 wherein the outer nozzle body has its chamber provided with a pair of ports, one releasably connected to the cooling fluid inlet and the other releasably connected to the chamber of the inner nozzle body, said outer nozzle body being movable axially of the inner nozzle on release of the clamping means to permit releasing the connection of its said ports and thereby its complete separation from the welding gun, including the inner nozzle body.

7. The combination of claim 6 wherein the releasable connection of one of said ports to the inner nozzle body includes a flexible tube and the releasable connection to the cooling fluid inlet includes a rigid tube, both said flexible tube and rigid tube being slidably supported on the flanged rear end portion of the inner nozzle body so as to move axially therewith.

8. In a welding gun having a cooling fluid inlet and a cooling fluid outlet, the combination of a housing, a nozzle including an inner body and an outer body, the inner nozzle body having a laterally flanged mount on the rear end thereof which is secured within the housing and having a wire electrode feed bore therethrough, the outer nozzle body having a rear flanged end, and means for releaseably clamping its rear flanged end to the laterally flanged mount of the inner nozzle body, each said nozzle bodies having a pair of spaced passages which extend longitudinally thereof and communicate with each other adjacent said forward end, the passages of the outer nozzle body each having a communicating port through the rear flanged end of the outer nozzle body, and means for releaseably connecting one of said ports to one of said cooling fluid inlet and outlet and the other port to one of the passages of the inner nozzle body, the other passage of the inner nozzle body being connectable to the other of said inlet and outlet whereby cooling fluid may be continuously flowed through the two nozzle bodies for the cooling effect thereon.

9. The combination of claim 8 wherein said releasable connecting means includes a flexible tube folded back on itself and detachably coupled to one of said ports and a second tube connected to the outlet and releaseably coupled to the other port, both said tubes being axially slidably supported on the laterally flanged mount of the inner nozzle body so as to accommodate axial movement of the outer nozzle body relative to the inner nozzle body when said clamping means are released.

10. The combination of claim 8 wherein said nozzle bodies each includes an inner and an outer sleeve brazed at their forward ends to a centrally bored plug and at their rear ends to a flange bearing member, the inner sleeve being so shaped as to provide a pair of diametrically opposite longitudinally extending passages and a communicating encircling chamber at its forward end which are closed by the outer sleeve plug and flange bearing member.

11. In a welding gun, the combination of a housing, an inner nozzle body and an outer nozzle body encircling said inner nozzle body in spaced relation therewith and extending forwardly of the forward end of said inner nozzle body, the inner nozzle body including an integral mount by which it detachably seats within the housing, the outer nozzle body having a rear flanged end, and means detachably clamping said rear flanged end of the outer nozzle body to the inner nozzle body mount, said nozzle bodies each containing a cooling fluid chamber encircling at least its forward end, the outer nozzle body having a pair of tubular fittings in its rear flanged end which communicate with the cooling fluid chamber thereof, and first and second freely axially movable tubes detachably coupled to said fittings, means adapting the first tube for connecting the chamber of the outer nozzle body to the chamber of the inner nozzle body, and further means adapting the second tube for connection to one of a fluid inlet hose and a fluid outlet hose, the inner nozzle body chamber being also connectable to the other of said fluid inlet hose and fluid outlet hose.

12. The combination of claim 11 wherein the first tube connecting the chambers of the two nozzles comprises a flexible tube which is folded back in part on itself to accommodate axial movement of the outer nozzle body relative to the inner nozzle body when the rear flanged end of the outer nozzle body is detached from the rear nozzle body mount.

13. The combination of claim 12 wherein both the first and second tubes are slidably supported on the inner nozzle body mount and the second tube connects to the water outlet hose.

14. The combination of claim 11 wherein the inner nozzle body includes means on its rear side for detachably connecting one end of a wire electrode casing thereto in aligned relation with the wire electrode receiving bore of the inner nozzle body, said means being operable through an access opening provided in the housing.

15. The combination of claim 11 wherein an insulating washer is positioned between the rear flanged end of the outer nozzle body and the integral mount of the inner nozzle body, said washer having an aperture which aligns with an opening in the flanged end of the outer nozzle body communicating with the space provided thereby about the inner nozzle body, the integral mount of the inner nozzle body having means for connection to a gas hose communicating with said aperture in the washer such that gas may be channeled into the space between the two nozzle bodies for direction out the forward end thereof.

References Cited

UNITED STATES PATENTS

| | | | |
|---|---|---|---|
| 2,547,872 | 4/1951 | Kissick | 219—75 |
| 2,727,970 | 12/1955 | Turbett | 219—130 |

JOSEPH V. TRUHE, Primary Examiner

C. L. ALBRITTON, Assistant Examiner

U.S. Cl. X.R.

219—74